(12) United States Patent
Guo et al.

(10) Patent No.: US 12,009,483 B2
(45) Date of Patent: *Jun. 11, 2024

(54) SECONDARY BATTERY CELL AND WINDING FORMATION SYSTEM THEREOF

(71) Applicant: NINGDE AMPEREX TECHNOLOGY LIMITED, Ningde (CN)

(72) Inventors: Peipei Guo, Ningde (CN); Yi Zhao, Ningde (CN); Ping He, Ningde (CN); Hongxin Fang, Ningde (CN); Wenqiang Cheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,936

(22) Filed: Mar. 31, 2022

(65) Prior Publication Data

US 2022/0328941 A1  Oct. 13, 2022

Related U.S. Application Data

(63) Continuation of application No. 15/908,327, filed on Feb. 28, 2018, now Pat. No. 11,329,352, which is a
(Continued)

(51) Int. Cl.
*H01M 10/00* (2006.01)
*H01M 10/04* (2006.01)
(Continued)

(52) U.S. Cl.
CPC ... *H01M 10/0585* (2013.01); *H01M 10/0409* (2013.01); *H01M 10/0431* (2013.01);
(Continued)

(58) Field of Classification Search
CPC ......... H01M 10/0585; H01M 10/0409; H01M 10/0431; H01M 10/0525; H01M 10/0587;
(Continued)

(56) References Cited

U.S. PATENT DOCUMENTS

| 5,017,442 | A | 5/1991 | Watanabe et al. |
| 5,154,993 | A | 10/1992 | Beatty |

(Continued)

FOREIGN PATENT DOCUMENTS

| CN | 1350350 A | 5/2002 |
| CN | 1221054 C | 9/2005 |

(Continued)

OTHER PUBLICATIONS

Professional translation of CN-101826609-A, obtained May 1, 2023 (Year: 2010).*

(Continued)

*Primary Examiner* — Nicholas P D'Aniello
(74) *Attorney, Agent, or Firm* — Morgan, Lewis & Bockius LLP

(57) ABSTRACT

A secondary battery cell includes an anode electrode plate, an anode electrode tab, a cathode electrode plate, a cathode electrode tab and a separator. The secondary battery cell winding formation system includes a working platform, a winding mechanism, an anode electrode plate unwinding roller, an anode electrode plate cleaning mechanism, an anode electrode plate die-cutting mechanism, an anode electrode tab supply mechanism, an anode electrode tab connection mechanism, an anode electrode plate convey mechanism, a cathode electrode plate unwinding roller, a cathode electrode plate cleaning mechanism, a cathode electrode plate die-cutting mechanism, a cathode electrode tab supply mechanism a cathode electrode tab connection mechanism, a cathode electrode plate convey mechanism, a
(Continued)

first separator unwinding roller, a second separator unwinding roller, a first separator convey mechanism and a second separator convey mechanism.

18 Claims, 7 Drawing Sheets

Related U.S. Application Data continuation of application No. PCT/CN2015/088638, filed on Aug. 31, 2015.

(51) Int. Cl.
| | |
|---|---|
| H01M 10/0525 | (2010.01) |
| H01M 10/0585 | (2010.01) |
| H01M 10/0587 | (2010.01) |
| H01M 50/528 | (2021.01) |
| H01M 50/536 | (2021.01) |
| H01M 50/538 | (2021.01) |

(52) U.S. Cl.
CPC ... *H01M 10/0525* (2013.01); *H01M 10/0587* (2013.01); *H01M 50/528* (2021.01); *H01M 50/536* (2021.01); *H01M 50/538* (2021.01); *H01M 2220/20* (2013.01)

(58) Field of Classification Search
CPC ............ H01M 50/528; H01M 50/536; H01M 50/538; H01M 2220/20; Y02E 60/10; Y02P 70/50
See application file for complete search history.

(56) References Cited

U.S. PATENT DOCUMENTS

| | | | |
|---|---|---|---|
| 5,478,668 A | 12/1995 | Gozdz et al. | |
| 6,100,114 A | 8/2000 | Milkovich et al. | |
| 6,300,002 B1 | 10/2001 | Webb et al. | |
| 6,551,143 B2 | 4/2003 | Tanaka et al. | |
| 8,232,008 B2 | 7/2012 | Morishima et al. | |
| 8,309,880 B2 | 11/2012 | Chung | |
| 8,969,756 B2 | 3/2015 | Dougherty | |
| 9,935,339 B2 | 4/2018 | Yoshida et al. | |
| 10,062,897 B2 | 8/2018 | Stern et al. | |
| 10,833,363 B2* | 11/2020 | Wang ............... | H01G 11/64 |
| 10,964,987 B2* | 3/2021 | Yi ............... | H01M 50/434 |
| 11,329,352 B2* | 5/2022 | Guo ............... | H01M 50/538 |
| 2001/0036574 A1 | 11/2001 | Fukuda et al. | |
| 2004/0161662 A1 | 8/2004 | Kim et al. | |
| 2006/0051662 A1 | 3/2006 | Kwak et al. | |
| 2007/0122714 A1 | 5/2007 | Suzuki et al. | |
| 2007/0172736 A1 | 7/2007 | Fujikawa et al. | |
| 2009/0035638 A1 | 2/2009 | Tsai et al. | |
| 2011/0027636 A1 | 2/2011 | Lee et al. | |
| 2011/0159344 A1* | 6/2011 | Kobayashi ............ | H01M 4/366 |
| | | | 429/130 |
| 2011/0020694 A1 | 10/2011 | Khakhalev et al. | |
| 2012/0052295 A1 | 3/2012 | Iwata et al. | |
| 2013/0052499 A1* | 2/2013 | Hasegawa ............ | H01G 11/76 |
| | | | 429/94 |
| 2013/0252053 A1 | 9/2013 | Woo | |
| 2013/0260203 A1 | 10/2013 | Yoshida et al. | |
| 2013/0302674 A1 | 11/2013 | Stern et al. | |
| 2014/0042121 A1 | 2/2014 | Zhang et al. | |
| 2014/0120417 A1 | 5/2014 | Matsushita et al. | |
| 2015/0207111 A1 | 7/2015 | Tao et al. | |
| 2016/0013455 A1 | 1/2016 | Shiu et al. | |
| 2017/0092925 A1 | 3/2017 | Shiu et al. | |

FOREIGN PATENT DOCUMENTS

| | | | | |
|---|---|---|---|---|
| CN | 2786795 | Y | 6/2006 | |
| CN | 1805183 | A | 7/2006 | |
| CN | 19383682 | A | 6/2007 | |
| CN | 201087907 | Y | 7/2008 | |
| CN | 201336332 | Y | 10/2009 | |
| CN | 101615694 | A | 12/2009 | |
| CN | 101783402 | A | 7/2010 | |
| CN | 101304103 | B | 8/2010 | |
| CN | 101826609 | A * | 9/2010 | |
| CN | 101939873 | A | 1/2011 | |
| CN | 200980104217 | | 1/2011 | |
| CN | 102187497 | A | 9/2011 | |
| CN | 102315477 | A | 1/2012 | |
| CN | 202373667 | U | 8/2012 | |
| CN | 102694148 | A | 9/2012 | |
| CN | 202423456 | U | 9/2012 | |
| CN | 202495523 | U | 10/2012 | |
| CN | 202585621 | U | 12/2012 | |
| CN | 202839841 | U | 3/2013 | |
| CN | 103066239 | A | 4/2013 | |
| CN | 103579666 | A | 2/2014 | |
| CN | 203574050 | U | 4/2014 | |
| CN | 203733894 | U | 7/2014 | |
| CN | 104157914 | A | 11/2014 | |
| CN | 104157914 | A * | 11/2014 | ........ H01M 10/0525 |
| CN | 204538109 | U | 8/2015 | |
| CN | 204905336 | U | 12/2015 | |
| CN | 204946995 | U | 1/2016 | |
| CN | 105406028 | A | 3/2016 | |
| CN | 105514352 | | 4/2016 | |
| CN | 205355186 | U | 6/2016 | |
| CN | 105990612 | A | 10/2016 | |
| CN | 108352492 | B | 8/2021 | |
| JP | 1993013064 | A | 1/1993 | |
| JP | H0513064 | A | 1/1993 | |
| JP | H0527951 | A | 4/1993 | |
| JP | H0620707 | A | 1/1994 | |
| JP | 1999317218 | A | 11/1999 | |
| JP | H11317218 | A | 11/1999 | |
| JP | 2000067907 | A | 3/2000 | |
| JP | 2000277155 | A | 10/2000 | |
| JP | 2000323135 | A | 11/2000 | |
| JP | 2003-105093 | | 4/2003 | |
| JP | 2003132875 | A | 5/2003 | |
| JP | 2007165224 | A | 6/2007 | |
| JP | 2008171593 | A | 7/2008 | |
| JP | 4380201 | B2 | 12/2009 | |
| JP | 2010055906 | A | 3/2010 | |
| JP | 2010073653 | A | 4/2010 | |
| JP | 2013-201094 | A | 10/2013 | |
| WO | WO/2012072222 | A1 | 6/2012 | |
| WO | WO/2013038677 | A1 | 3/2013 | |
| WO | WO2017035749 | A1 | 3/2017 | |

OTHER PUBLICATIONS

Professional translation of CN-104157914-A, obtained May 1, 2023 (Year: 2014).*
Ningde Amperex Technology Limited, International Search Report and Written Opinion, PCT/CN2015/088638, May 27, 2016, 17 pgs.
Chinese Office Action, CN201580082766.1, May 27, 2020, 7 pgs.
Chinese Office Action, CN201580082766.1, Jan. 08, 2021, 7 pgs.
Guo, Office Action, U.S. Appl. No. 15/908,327, Oct. 24, 2019, 9 pgs.
Guo, Office Action, U.S. Appl. No. 15/908,327, Oct. 19, 2020, 8 pgs.
Guo, Final Office Action, U.S. Appl. No. 15/908,327, Mar. 09, 2021, 8 pgs.
Guo, Notice of Allowance, U.S. Appl. No. 15/908,327, Jan. 12, 2022, 9 pgs.
Evaluation Report of Utility Model Patent, ZL2014200303194, Dec. 24, 2019, 6 pgs.
Machine translation of JP2007165224A (year: 2007), 8 pgs.
Machine translation of WO2013038677A1 (year: 2013), 15 pgs.
Tao, Office Action, U.S. Appl. No. 14/596,873, Apr. 4, 2017, 13 pgs.
Tao, Office Action, U.S. Appl. No. 14/596,873, Apr. 19, 2018, 13 pgs.
Tao, Final Office Action, U.S. Appl. No. 14/596,873, Dec. 5, 2018, 13 pgs.

(56) References Cited

OTHER PUBLICATIONS

Tao, Office Action, U.S. Appl. No. 14/596,873, May 22, 2019, 14 pgs.
Tao, Notice of Allowance, U.S. Appl. No. 14/596,873, Nov. 25, 2019, 7 pgs.
Tao, Office Action, U.S. Appl. No. 16/113,938, Aug. 16, 2019, 17 pgs.
Tao, Final Office Action, U.S. Appl. No. 16/113,938, Feb. 13, 2020, 22 pgs.
Tao, Office Action, U.S. Appl. No. 16/113,938, Nov. 2, 2020, 14 pgs.
Tao, Final Office Action, U.S. Appl. No. 16/113,938, May 20, 2021, 22 pgs.
Tao, Advisory Action, U.S. Appl. No. 16/113,938, Aug. 2, 2021, 3 pgs.
Tao, Office Action, U.S. Appl. No. 17/407,081, Aug. 5, 2022, 19 pgs.
Tao, Final Office Action, U.S. Appl. No. 17/407,081, Jan. 18, 2023, 19 pgs.
Tao, Office Action, U.S. Appl. No. 17/746,755, Jul. 28, 2022, 18 pgs.
Tao, Final Office Action, U.S. Appl. No. 17/746,755, Oct. 24, 2022, 25 pgs.
Tao, Office Action, U.S. Appl. No. 17/746,755, Mar. 31, 2023, 27 pgs.
*Zhuhai Cosmx Battery Co LTD*, Petitioner, v. *Ningde Amperex Technlogy Limited*, Patent Owner, Petition for Inter Partes Review, Case No. IPR2023-00585, Mar. 31, 2023, 116 pgs.
Office Action, CN201420030319.4, Jul. 14, 2023, 6 pgs.
Office Action, CN201420030319.4, Aug. 17, 2023, 5 pgs.
Invalidity Request, ZL201420030319.4, Aug. 4, 2023, 92 pgs.
Invalidity, ZL201420030319.4, Jul. 4, 2023, 7 pgs.
Tao, Notice of Allowance, U.S. Appl. No. 17/746,755, Sep. 7, 2023, 7 pgs.
Guo, Final Office Action, U.S. Appl. No. 15/908,327, Jan. 31, 2020, 9 pgs.
Guo, Non-Final Office Action, U.S. Appl. No. 15/908,327, Jul. 23, 2021, 9 pgs.
Guo, Corrected Notice of Allowance, U.S. Appl. No. 15/908,327, Jan. 21, 2022, 6 pgs.
Official filing receipt of Invalidation Request, ZL201580082766.1, Jan. 24, 2024, 10 pgs.
Notification of forwarding documents Invalidity Request, ZL201580082766.1, Mar. 12, 2024, 77 pgs.
Evidence document 2, Zhang Fei, Research on UV laser micromachining technology and mechanism of electronic materials, Huazhong University of Science & Technology, May 2012, 129 pgs.
Evidence document 3, Yang Shichun, et al., Surface quality and finishing technology, 15 pgs.
Evidence document 4, Guan Yuming,et al., Machinery Design & Manufacture, School of Mechanical and Power Engineering, East China University of Science and Technology, Shanghai, Jan. 2009, 4 pgs.
Evidence document 13, Qi Yie, Study on Improving Non-fluid Lubrication Performance by Surface Texturing, Mar. 2014, 83 pgs.
Evidence document 14, XIANGXin et al., Influence of Dimple Texture on Tribological Behavior of Line Contact Friction Pairs, China Surface Engineering, China Surface Engineering, vol. 28, No. 4, Aug. 2015, 11 pgs.
Evidence document 17, The prosecution history of the counterpart Chinese application 2015800827661, provided by CNIPA, 176 pgs.

\* cited by examiner

SECONDARY BATTERY CELL AND WINDING FORMATION SYSTEM THEREOF

CROSS-REFERENCE TO THE RELATED APPLICATIONS

This application is a continuation application of U.S. patent application Ser. No. 15/908,327, filed on Feb. 28, 2018, entitled "SECONDARY BATTERY CELL AND WINDING FORMATION SYSTEM THEREOF" which is a National Stage application of PCT international application PCT/CN 2015/088638, filed on Aug. 31, 2015, entitled "SECONDARY BATTERY CELL AND WINDING FORMATION SYSTEM THEREOF", all of which are incorporated herein by reference in their entirety.

TECHNICAL FIELD

The present invention relates to the field of secondary batteries, in particular to a secondary battery cell and winding formation system thereof.

BACKGROUND

The lithium ion battery (one kind of secondary batteries) is widely used in the fields of electronic products, automobiles, electric vehicles, aerospace, micro-electromechanical systems, energy storage and the like. As the application environment and conditions tend to be more complex and rigorous, high requirements are proposed to the usage safety performance, energy density and manufacturing cost of the lithium-ion battery.

In the prior art, the purpose of improving energy density is achieved by configuring a groove on an electrode plate and welding an electrode tab in the groove. However, the process is realized by independent laser cleaning device and welding-winding device respectively at the present stage. The comprehensive cost of the devices is high, and the factory buildings occupy large space, with the result the manufacturing cost of the entire lithium battery is high. Furthermore, the laser cleaned groove on the electrode plate has an overheated perforation or a burned hole on the edge due to focal length fluctuation and deviation, such that a plenty of burrs are formed on a current collector on the edge of the groove; if the electrode plate with burrs is directly manufactured into a cell without processing, then the burrs will pierce the separator to cause internal short circuit, a fire disaster and other severe potential safety hazards. In the prior art, a thick adhesive tape is stuck in the groove to prevent the burrs from piercing the separator. However, sticking an adhesive tape in the groove will certainly increase the thickness of the cell, thus causing loss to energy density.

SUMMARY

To solve the problems in the prior art, the object of the present invention is to provide a secondary battery cell, which can prevent the secondary battery cell from generating internal short circuit while improving the energy density of the secondary battery cell, thus improving the safety performance of the secondary battery cell.

Another object of the present invention is to provide a secondary battery cell winding formation system, which can reduce the volume of the secondary battery cell winding formation system save the floor area of a factory building, reduce the manufacturing cost of the secondary battery cell, and improve the energy density and safety performance of the manufactured secondary battery cell.

To achieve the above objects, in a first aspect, the present invention provides a secondary battery cell, comprising an anode electrode plate, an anode electrode tab, a cathode electrode plate, a cathode electrode tab and a separator.

The anode electrode plate comprises: an anode current collector; and an anode slurry layer disposed on the surface of the anode current collector.

The cathode electrode plate comprises: a cathode current collector; and a cathode slurry layer disposed on the surface of the cathode current collector.

The separator is disposed between the anode electrode plate and the cathode electrode plate.

The anode electrode plate is formed with: an anode electrode tab receiving groove, provided with the anode current collector at the bottom and the anode slurry layer on the periphery, the anode electrode tab is received in the anode electrode tab receiving groove and is electrically connected to the anode current collector at the anode electrode tab receiving groove.

The cathode electrode plate is formed with: a cathode electrode tab receiving groove, provided with the cathode current collector at the bottom and the cathode slurry layer on the periphery, the cathode electrode tab is received in the cathode electrode tab receiving groove and is electrically connected to the cathode current collector at the cathode electrode tab receiving groove.

The anode electrode plate is further formed with: an anode electrode plate notch, located on the side edge of the anode electrode tab receiving groove and extending through the anode electrode plate.

The cathode electrode plate is further formed with: a cathode electrode plate notch, located on the side edge of the cathode electrode tab receiving groove and extending through the cathode electrode plate.

To achieve the above object, in a second aspect, the present invention provides a secondary battery cell winding formation system, comprising a working platform, a winding mechanism, an anode electrode plate unwinding roller, an anode electrode plate cleaning mechanism, an anode electrode plate die-cutting mechanism, an anode electrode tab supply mechanism, an anode electrode tab connection mechanism, an anode electrode plate convey mechanism, a cathode electrode plate unwinding roller, a cathode electrode plate cleaning mechanism, a cathode electrode plate die-cutting mechanism, a cathode electrode tab supply mechanism, a cathode electrode tab connection mechanism, a cathode electrode plate convey mechanism, a first separator unwinding roller, a second separator unwinding roller, a first separator convey mechanism and a second separator convey mechanism.

The working platform is fixed immovably.

The winding mechanism is disposed on the working platform.

The anode electrode plate unwinding roller is disposed on the working platform, and is wound with an anode electrode plate, wherein the anode electrode plate comprises: an anode current collector; and an anode slurry layer disposed on the surface of the anode current collector.

The anode electrode plate cleaning mechanism is disposed on the working platform, is located at the downstream of the anode electrode plate unwinding roller, and is used for cleaning out, on the anode electrode plate, an anode electrode tab receiving groove provided with the anode current collector at the bottom and the anode slurry layer on the periphery.

The anode electrode plate die-cutting mechanism is disposed on the working platform, is located at the downstream of the anode electrode plate cleaning mechanism, and is used for, on the side edge of the anode electrode tab receiving groove, die-cutting the anode electrode plate to form an anode electrode plate notch extending through the anode electrode plate.

The anode electrode tab supply mechanism is disposed on the working platform, is located at the downstream of the anode electrode plate die-cutting mechanism, is wound with an anode electrode tab, and is used for supplying the anode electrode tab to the anode electrode tab receiving groove of the anode electrode plate of the anode electrode plate notch, such that the anode electrode tab is received in the anode electrode tab receiving groove.

The anode electrode tab connection mechanism is disposed on the working platform, is located at the downstream of the anode electrode plate die-cutting mechanism, and is used for electrically connecting and fixing the anode electrode tab received in the anode electrode tab receiving groove with the anode current collector at the anode electrode tab receiving groove.

The anode electrode plate convey mechanism is disposed on the working platform, and is used for conveying the anode electrode plate unwound from the anode electrode plate unwinding roller to the winding mechanism sequentially via the anode electrode plate cleaning mechanism, the anode electrode plate die-cutting mechanism and the anode electrode tab connection mechanism.

The cathode electrode plate unwinding roller is disposed on the working platform, and is wound with a cathode electrode plate, wherein the cathode electrode plate comprises: a cathode current collector; and a cathode slurry layer disposed on the surface of the cathode current collector.

The cathode electrode plate cleaning mechanism is disposed on the working platform, is located at the downstream of the cathode electrode plate unwinding roller, and is used for cleaning out, on the cathode electrode plate, a cathode electrode tab receiving groove provided with the cathode current collector at the bottom and the cathode slurry layer on the periphery.

The cathode electrode plate die-cutting mechanism is disposed on the working platform, is located at the downstream of the cathode electrode plate cleaning mechanism, and is used for, on the side edge of the cathode electrode tab receiving groove, die-cutting the cathode electrode plate to form a cathode electrode plate die-cut notch extending through the cathode electrode plate.

The cathode electrode tab supply mechanism is disposed on the working platform, is located at the downstream of the cathode electrode plate die-cutting mechanism, is wound with a cathode electrode tab, and is used for supplying the cathode electrode tab to the cathode electrode tab receiving groove of the cathode electrode plate having out the cathode electrode plate notch, such that the cathode electrode tab is received in the cathode electrode tab receiving groove.

The cathode electrode tab connection mechanism is disposed on the working platform, is located at the downstream of the cathode electrode plate die-cutting mechanism, and is used for electrically connecting and fixing the cathode electrode tab received in the cathode electrode tab receiving groove with the cathode current collector at the cathode electrode tab receiving groove.

The cathode electrode plate convey mechanism is disposed on the working platform, and is used for conveying the cathode electrode plate unwound from the cathode electrode plate unwinding roller to the winding mechanism sequentially via the cathode electrode plate cleaning mechanism, the cathode electrode plate die-cutting mechanism and the cathode electrode tab connection mechanism.

The first separator unwinding roller is disposed on the working platform, and is wound with a separator.

The second separator unwinding roller is disposed on the working platform, and is wound with another separator.

The first separator convey mechanism is disposed on the working platform, and is used for conveying the corresponding separator unwound from the first separator unwinding roller to the winding mechanism, and enabling the corresponding separator to be configured between the anode electrode plate and the cathode electrode plate after the secondary battery cell is wound and formed.

The second separator convey mechanism is disposed on the working platform, and is used for conveying the corresponding separator unwound from the second separator unwinding roller to the winding mechanism, and enabling the corresponding separator to be configured between the anode electrode plate and the cathode electrode plate after the secondary battery cell is wound and formed.

The beneficial effects of the present invention are as follows:

In the secondary battery cell according to the present invention, the anode electrode tab is received in the anode electrode tab receiving groove, and the cathode electrode tab is received in the cathode electrode tab receiving groove, thus effectively improving the energy density of the secondary battery cell; the anode electrode plate notch can remove the burrs formed on the current collector on the edge part of the anode electrode tab receiving groove during formation, and the cathode electrode plate notch can effectively remove the burrs formed on the current collector on the edge part of the cathode electrode tab receiving groove during formation, thus effectively preventing the secondary battery cell from generating internal short circuit, and improving the safety performance of the secondary battery cell while ensuring a high energy density.

In the secondary battery cell winding formation system according to the present invention, the winding mechanism, the anode electrode plate unwinding roller, the anode electrode plate cleaning mechanism, the anode electrode plate die-cutting mechanism, the anode electrode tab supply mechanism, the anode electrode tab connection mechanism, the anode electrode plate convey mechanism, the cathode electrode plate unwinding roller, the cathode electrode plate cleaning mechanism, the cathode electrode plate die-cutting mechanism, the cathode electrode tab supply mechanism, the cathode electrode tab connection mechanism, the cathode electrode plate convey mechanism, the first separator unwinding roller, the second separator unwinding roller, the first separator convey mechanism and the second separator convey mechanism are integrated on one working platform, thus reducing the volume of the secondary battery cell winding formation system, saving the floor area of a factory building, and reducing the manufacturing cost of the secondary battery cell; the anode electrode plate die-cutting mechanism can remove burrs cleaned out by the anode electrode plate cleaning mechanism and located on the current collector on the edge part of the anode electrode tab receiving groove, and the cathode electrode plate die-cutting mechanism can remove burrs cleaned out by the cathode electrode plate cleaning mechanism and located on the current collector on the edge part of the cathode electrode tab receiving groove, thus effectively preventing the manufactured secondary battery cell from generating internal short circuit, and improving the safety performance of the manufactured secondary battery cell.

BRIEF DESCRIPTION OF THE DRAWINGS

FIG. 2 is a schematic view of the welded anode electrode plate and electrode tab of the secondary battery cell of the present invention, wherein FIG. 2(a) is a sectional view of the welded anode electrode plate and electrode tab, and FIG. 2(b) is a top view of the anode electrode plate as shown in FIG. 2(a);

FIG. 3 is a schematic view of the welded cathode electrode plate and electrode tab of the secondary battery cell of the present invention, wherein FIG. 3(a) is a sectional view of the welded cathode electrode plate and electrode tab, and FIG. 3(b) is a bottom view of the cathode electrode plate as shown in FIG. 3(a);

FIG. 4 is a schematic view showing the die-cutting process of the electrode plates of the secondary battery cell of the present invention, wherein FIG. 4(a) is a schematic view showing the die-cutting process of the anode electrode plate, and FIG. 4(b) is a schematic view showing the die-cutting process of the cathode electrode plate;

FIG. 5 is a schematic view of the electrode plates of the secondary battery cell of the present invention, wherein FIG. 5(a) is a schematic view of the anode electrode plate, and FIG. 5(b) is a schematic view of the cathode electrode plate; and FIG. 6 is a schematic view of the electrode plates of a secondary battery cell in the prior art, wherein FIG. 6(a) is a schematic view of the anode electrode plate, and FIG. 6(b) is a schematic view of the cathode electrode plate.

Figure 1:
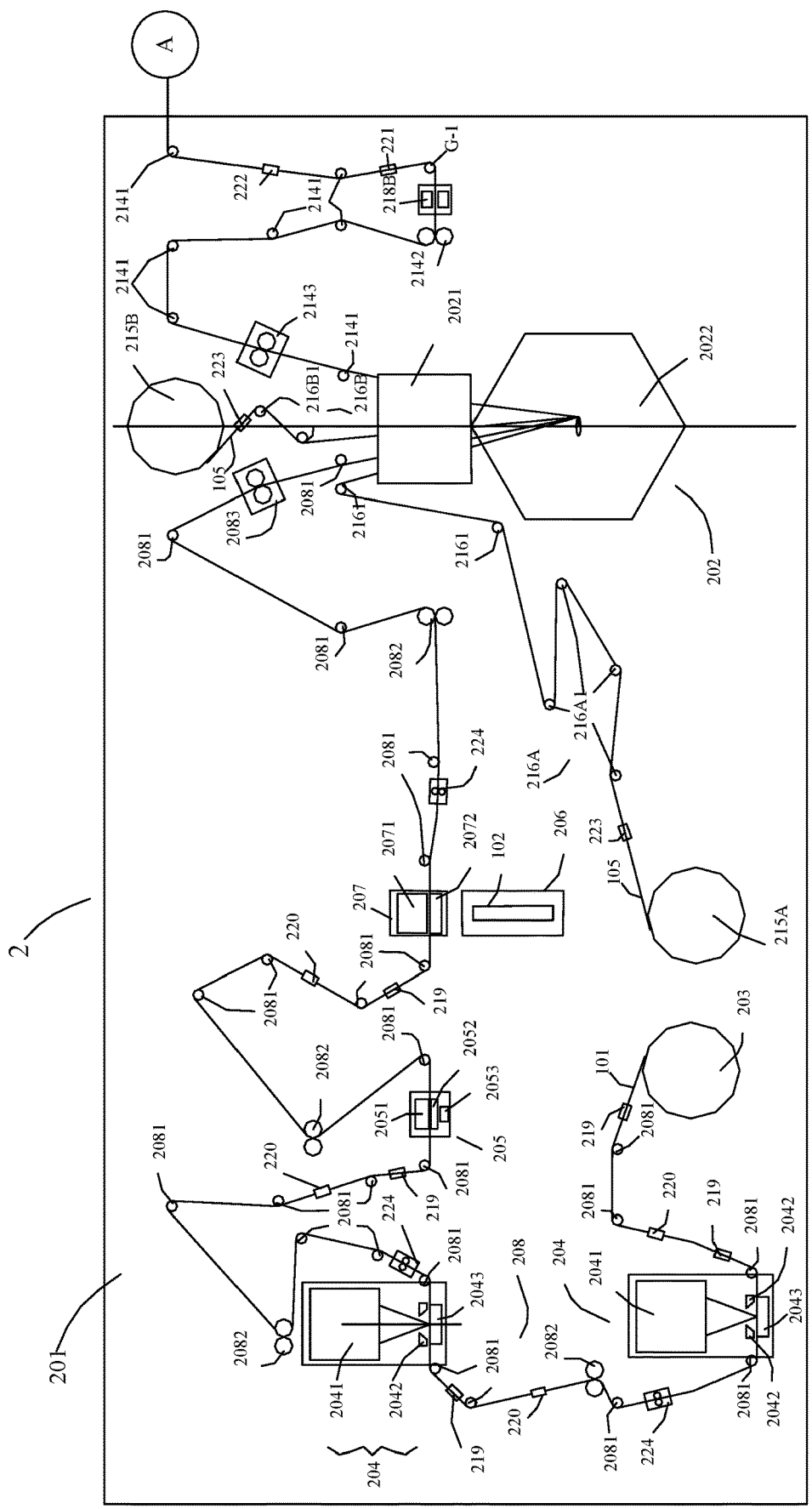
FIG. 1 is a schematic view of the secondary battery cell winding formation system of the present invention.
Figure 1:
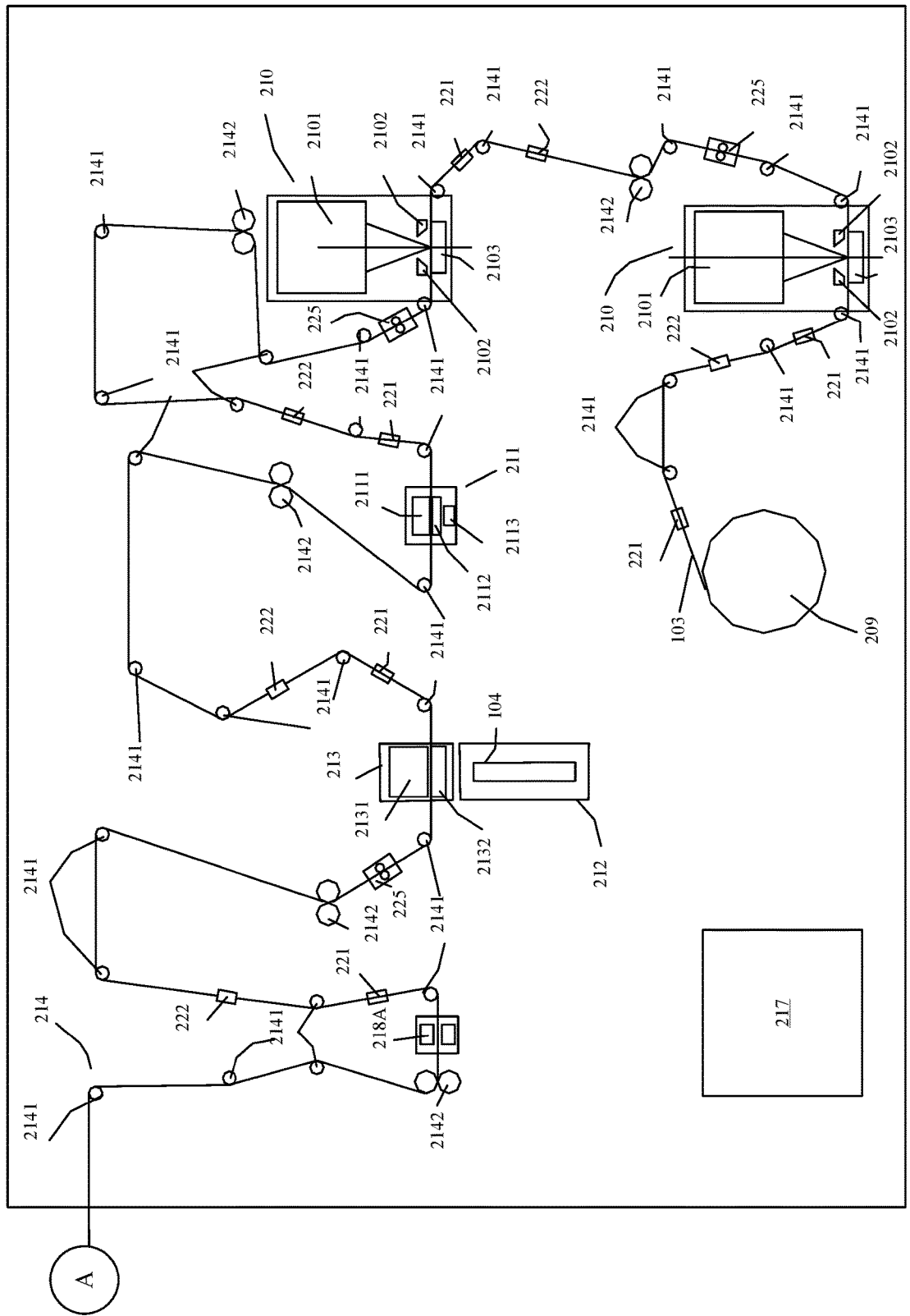

Wherein the reference numbers are described as follows:
1 Secondary battery cell
101 Anode electrode plate
1011 Anode current collector
1012 Anode slurry layer
1013 Anode electrode tab receiving groove
1014 Anode electrode plate notch
1015 Anode paired recess
102 Anode electrode tab
103 Cathode electrode plate
1031 Cathode current collector
1032 Cathode slurry layer
1033 Cathode electrode tab receiving groove
1034 Cathode electrode plate notch
1035 Cathode paired recess
104 Cathode electrode tab
105 Separator
2 Secondary battery cell winding formation system
201 Working platform
202 Winding mechanism
2021 Dust remover
2022 Winding device
203 Anode electrode plate unwinding roller
204 Anode electrode plate cleaning mechanism
2041 Anode electrode plate laser cleaning system
2042 Anode electrode plate dust removal mechanism
2043 Anode electrode plate adsorption and cooling auxiliary platform
205 Anode electrode plate die-cutting mechanism
2051 Anode electrode plate die-cutting male die mechanism
2052 Anode electrode plate die-cutting female die mechanism
2053 Anode electrode plate waste collection mechanism
206 Anode electrode tab supply mechanism
207 Anode electrode tab connection mechanism
2071 Anode electrode tab welding head mechanism
2072 Anode electrode tab welding base mechanism
208 Anode electrode plate convey mechanism
2081 Fixed roller
2082 Main drive mechanism
2083 Main drive corrective mechanism
209 Cathode electrode plate unwinding roller
210 Cathode electrode plate cleaning mechanism
2101 Cathode electrode plate laser cleaning system
2102 Cathode electrode plate dust removal mechanism
2103 Cathode electrode plate adsorption and cooling auxiliary platform
211 Cathode electrode plate die-cutting mechanism
2111 Cathode electrode plate die-cutting male die mechanism
2112 Cathode electrode plate die-cutting female die mechanism
2113 Cathode electrode plate waste collection mechanism
212 Cathode electrode tab supply mechanism
213 Cathode electrode tab connection mechanism
2131 Cathode electrode tab welding head mechanism
2132 Cathode electrode tab welding base mechanism
214 Cathode electrode plate convey mechanism
2141 Fixed roller
2142 Main drive mechanism
2143 Main drive corrective mechanism
215A First separator unwinding roller
215B Second separator unwinding roller
216A First separator convey mechanism
216A1 Fixed roller
216B Second separator convey mechanism
216B1 Fixed roller
217 Central control mechanism
218A First cathode electrode plate sticking mechanism
218B Second cathode electrode plate sticking mechanism
219 Anode electrode plate sensing mechanism
220 Anode electrode plate corrective mechanism
221 Cathode electrode plate sensing mechanism
222 Cathode electrode plate corrective mechanism
223 Separator sensing mechanism
224 Anode electrode plate dust removal portion
225 Cathode electrode plate dust removal portion
T1 First insulating adhesive tape
T2 Second insulating adhesive tape
T3 Third insulating adhesive tape
T4 Fourth insulating adhesive tape
L Length direction
W Width direction

DETAILED DESCRIPTION

The secondary battery cell and winding formation system thereof of the present invention will be elaborated hereafter with reference to the drawings.

First, the secondary battery cell according to the first aspect of the present invention is elaborated.

With reference to FIG. 2-5, the secondary battery cell 1 according to the present invention comprises an anode electrode plate 101, an anode electrode tab 102, a cathode electrode plate 103, a cathode electrode tab 104 and a separator 105.

The anode electrode plate 101 comprises: an anode current collector 1011; and an anode slurry layer 1012 disposed on the surface of the anode current collector 1011.

The cathode electrode plate 103 comprises: a cathode current collector 1031; and a cathode slurry layer 1032 disposed on the surface of the cathode current collector 1031.

The separator 105 is disposed between the anode electrode plate 101 and the cathode electrode plate 103.

The anode electrode plate 101 is formed with: an anode electrode tab receiving groove 1013, provided with the anode current collector 1011 at the bottom and the anode slurry layer 1012 on the periphery, and receiving the anode electrode tab 102 therein, wherein the anode electrode tab 102 is electrically connected to the anode current collector 1011 at the anode electrode tab receiving groove 1013.

The cathode electrode plate 103 is formed with: a cathode electrode tab receiving groove 1033, provided with the cathode current collector 1031 at the bottom and the cathode slurry layer 1032 on the periphery, and receiving the cathode electrode tab 104 therein, wherein the cathode electrode tab 104 is electrically connected to the cathode current collector 1031 at the cathode electrode tab receiving groove 1033.

The anode electrode plate 101 is further formed with: an anode electrode plate notch 1014, located on the side edge of the anode electrode tab receiving groove 1013 and extending through the anode electrode plate 101; The cathode electrode plate 103 is further formed with: a cathode electrode plate notch 1034, located on the side edge of the cathode electrode tab receiving groove 1033 and extending through the cathode electrode plate 103.

In the secondary battery cell 1 according to the present invention, the anode electrode tab 102 is received in the anode electrode tab receiving groove 1013, and the cathode electrode tab 104 is received in the cathode electrode tab receiving groove 1033, thus effectively improving the energy density of the secondary battery cell 1; the anode electrode plate notch 1014 can remove the burrs formed on the current collector 1011 of the edge part of the anode electrode tab receiving groove 1013 during formation, and the cathode electrode plate notch 1034 can effectively remove the burrs formed on the current collector 1031 of the edge part of the cathode electrode tab receiving groove 1033 during formation, thus effectively preventing the secondary battery cell 1 from generating internal short circuit, and in turn improving the safety performance of the secondary battery cell 1 while ensuring a high energy density.

In the secondary battery cell 1 according to the present invention the secondary battery cell 1 is a wound-type cell.

Figure 5:
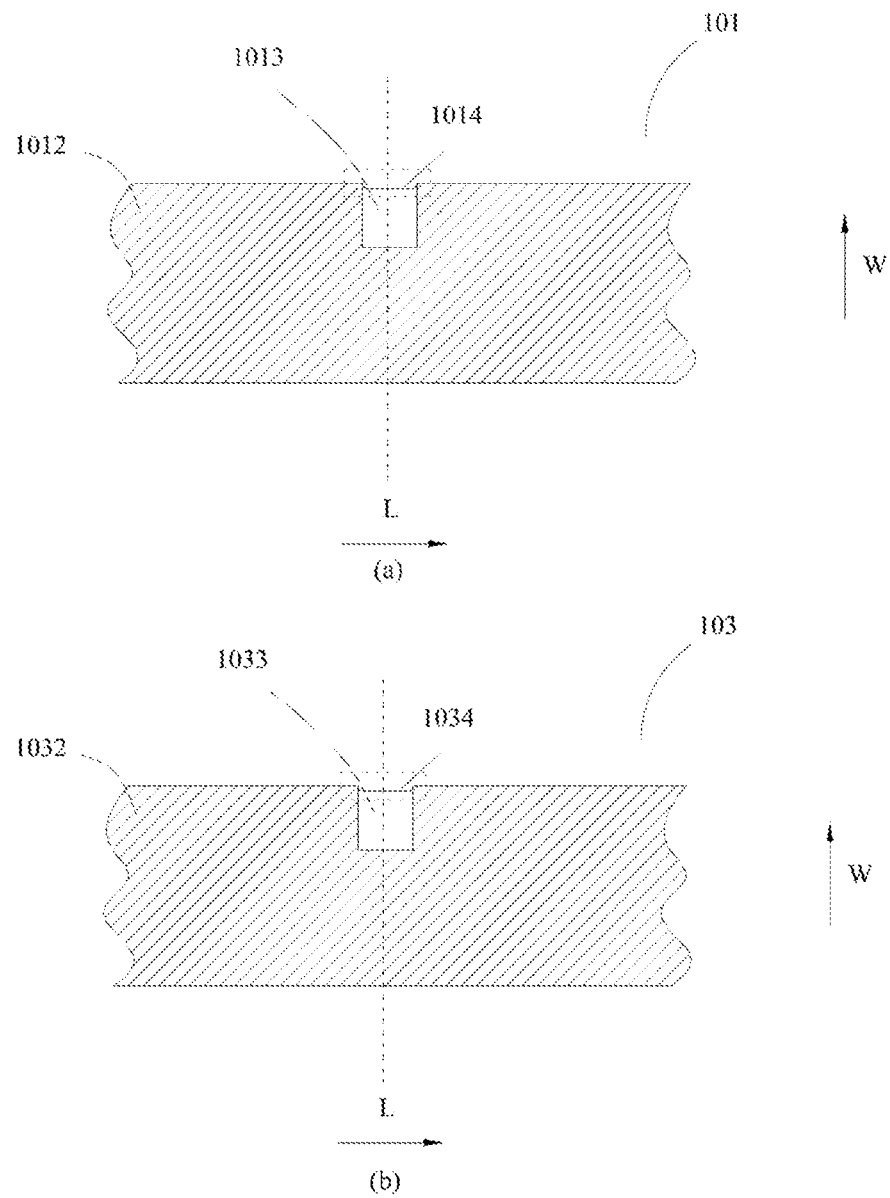

In the secondary battery cell 1 according to the present invention, with reference to FIG. 5(*a*), in one embodiment, the length of the anode electrode plate notch 1014 in the length direction L is 0.9-1.2 times of the length of the anode electrode tab receiving groove 1013; and the width of the anode electrode plate notch 1014 in the width direction W is 0.2-0.8 times of the width of the anode electrode tab receiving groove 1013.

In the secondary battery cell 1 according to the present invention, with reference to FIG. 5(*b*), in one embodiment, the length of the cathode electrode plate notch 1034 in the length direction L is 0.9-1.2 times of the length of the cathode electrode tab receiving groove 1033; and the width of the cathode electrode plate notch 1034 in the width direction W is 0.2-0.8 times of the width of the cathode electrode tab receiving groove 1033.

Figure 2:
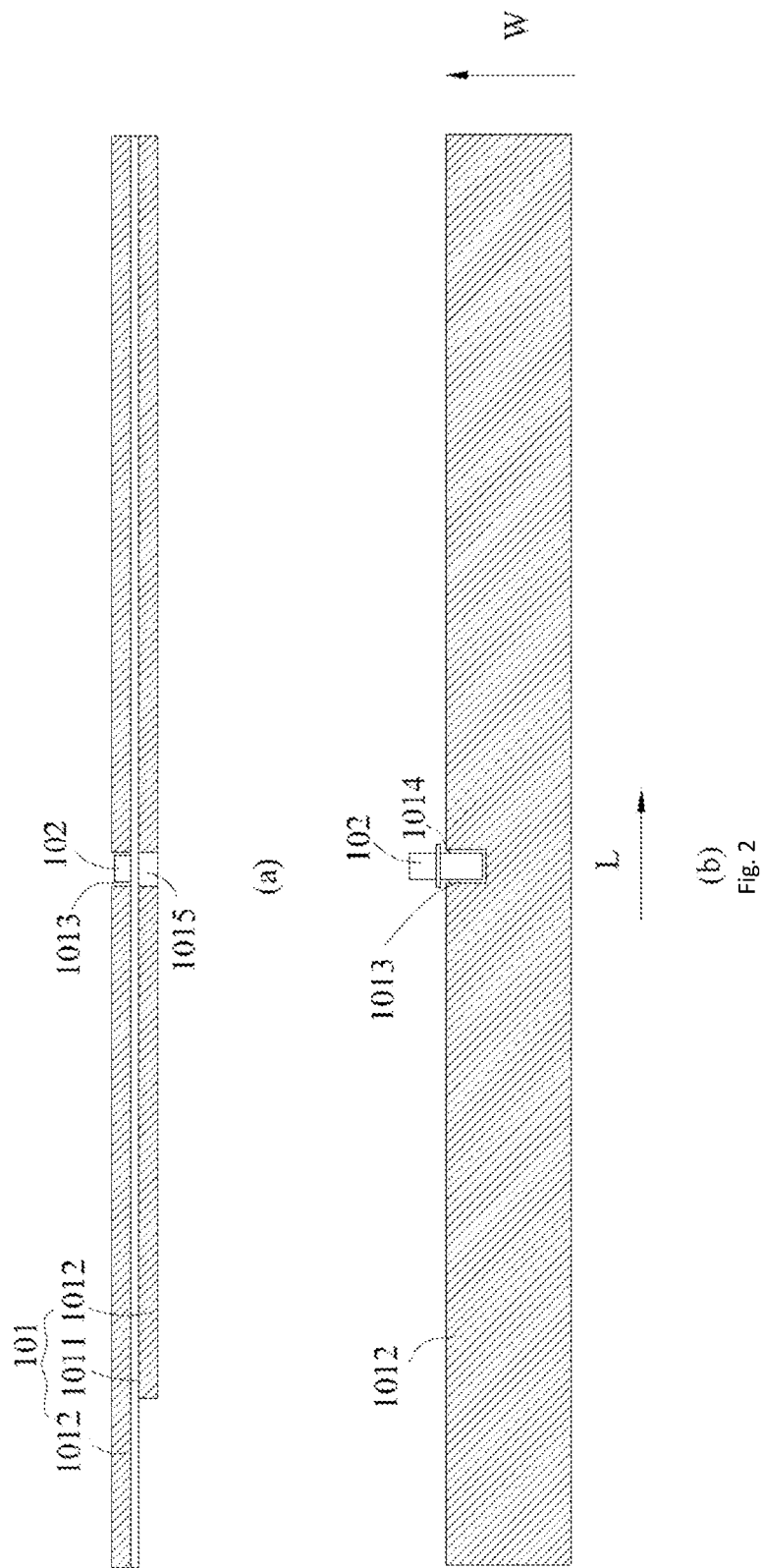

In the secondary battery cell 1 according to the present invention, with reference to FIG. 2, in one embodiment, the anode electrode plate 101 may not stick an insulating adhesive tape T. Sticking an insulating adhesive tape T on the anode electrode plate 101 could not improve the secondary battery cell 1, but on the contrary may probably increase the thickness of the secondary battery cell 1, and reduce the energy density of the secondary battery cell 1.

Figure 3:
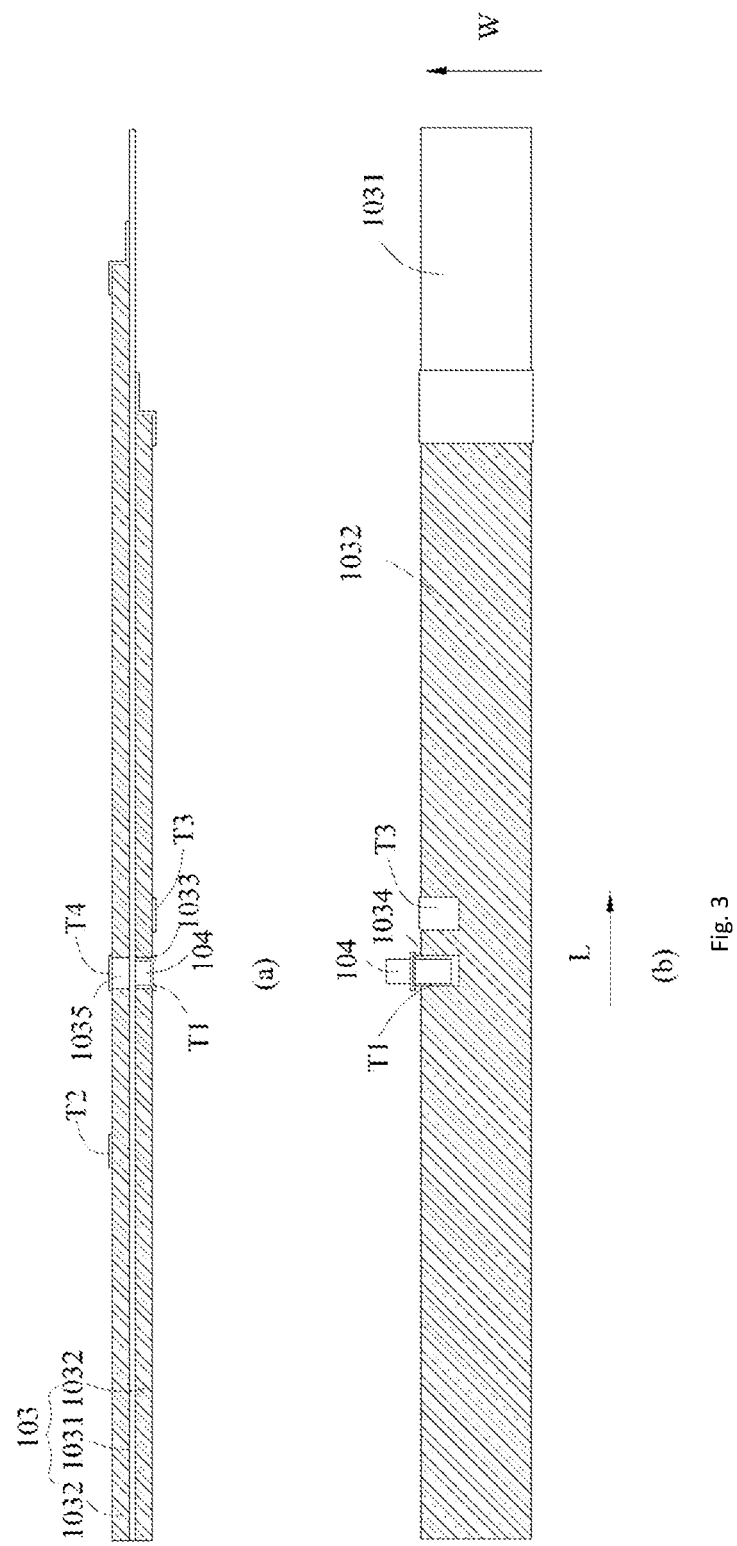
Figure 4:
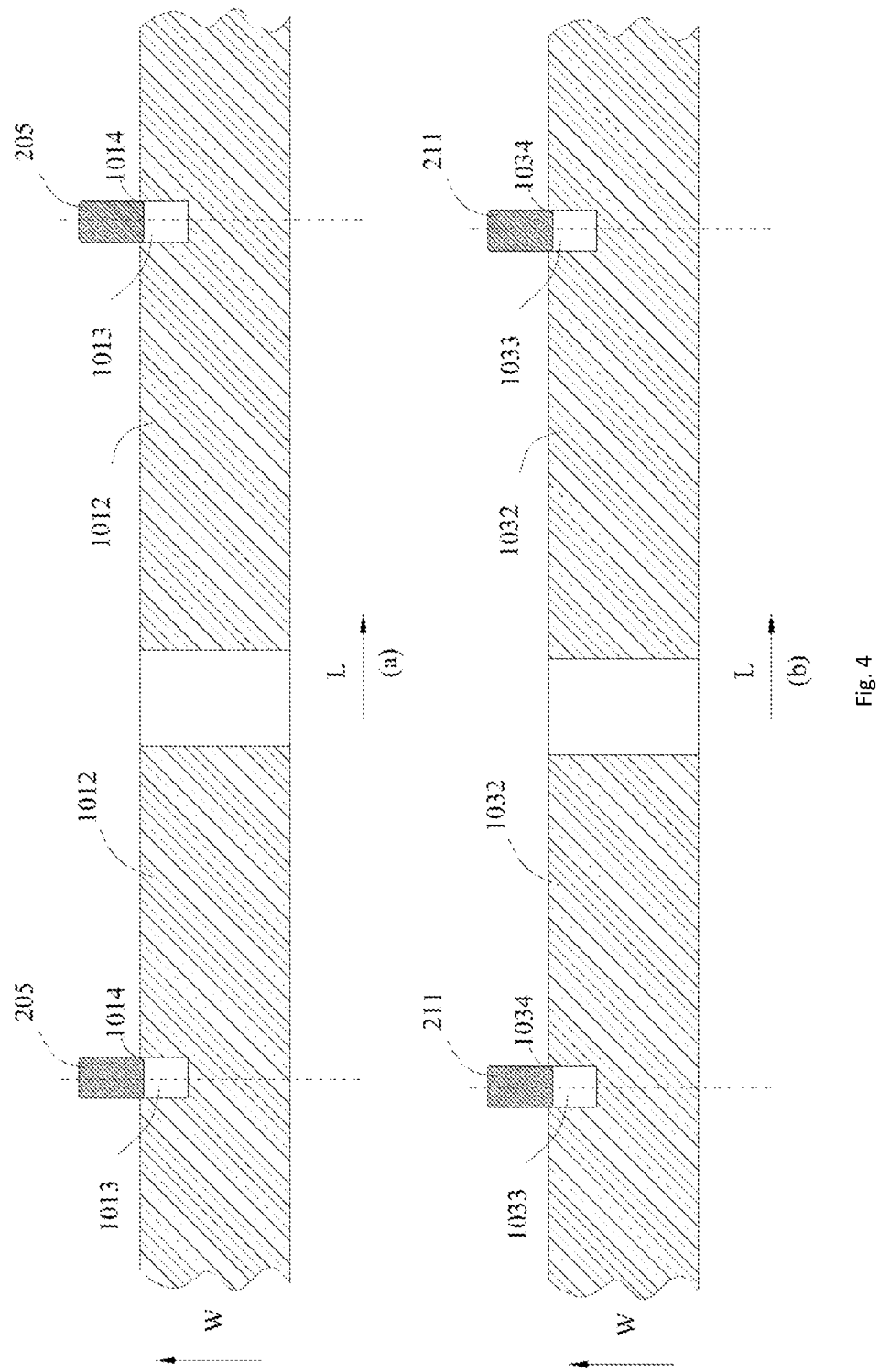

In the secondary battery cell 1 according to the present invention, with reference to FIG. 3, in one embodiment, the secondary battery cell 1 further comprises: a first insulating adhesive tape T1, stuck at the cathode electrode tab receiving groove 1033 having received the cathode electrode tab 104; and a second insulating adhesive tape T2, stuck on the cathode slurry layer 1032 at a position aligned with the anode electrode tab receiving groove 1013 after the secondary battery cell 1 is wound and formed. Since the second insulating adhesive tape T2 is stuck, the cathode active substance of the cathode slurry layer 1032 dissociating to the anode electrode tab 102 is reduced; the cathode active substance of the cathode slurry layer 1032 dissociating and diffusing to the aligned anode electrode tab 102 is reduced; further, the cathode active substance of the cathode slurry layer 1032 concentrating at the anode electrode tab 102 during the charging and discharging processes of the secondary battery is alleviated; and finally, the problem that the cathode active substance is separated out at the anode electrode tab 102 is alleviated, and in the meanwhile contacting and generating internal short circuit of the anode electrode tab 102 and the cathode electrode plate 103 is avoided when the burrs at the anode electrode tab 102 pierce the separator 105.

In the secondary battery cell 1 according to the present invention, with reference to FIG. 2(*a*), in one embodiment, the anode electrode plate 101 is further formed with an anode paired recess 1015, provided with the anode current collector 1011 at the bottom and the anode slurry layer 1012 on the periphery, and located exactly on the back side of the anode electrode tab receiving groove 1013; and with reference to FIGS. 3(*a*) and 3(*b*), in the present embodiment, the secondary battery cell 1 further comprises: a third insulating adhesive tape T3, stuck on the cathode slurry layer 1032 at a position aligned with the anode paired recess 1015 after the secondary battery cell 1 is wound and formed.

In the secondary battery cell 1 according to the present invention, with reference to FIG. 3(*a*), in one embodiment, the cathode electrode plate 103 is further formed with a cathode paired recess 1035, provided with the cathode current collector 1031 at the bottom and the cathode slurry layer 1032 on the periphery, and located exactly on the back side of the cathode electrode tab receiving groove 1033; and with reference to FIGS. 3(*a*) and 3(*b*), in the present embodiment, the secondary battery cell 1 further comprises: a fourth insulating adhesive tape T4, stuck on the cathode paired recess 1035.

In the secondary battery cell 1 according to the present invention, in one embodiment, the anode electrode plate 101 is further formed with an anode paired recess 1015, provided with the anode current collector 1011 at the bottom and the anode slurry layer 1012 on the periphery, and located exactly on the back side of the anode electrode tab receiving groove 1013, as shown in FIG. 2(*a*); and the cathode electrode plate 103 is further formed with a cathode paired recess 1035, provided with the cathode current collector 1031 at the bottom and the cathode slurry layer 1032 on the periphery, and located exactly on the back side of the cathode electrode tab receiving groove 1033, as shown in FIG. 3(*a*). With reference to FIGS. 3(*a*) and 3(*b*), in the present embodiment, the secondary battery cell 1 further comprises: a third insulating adhesive tape T3, stuck on the cathode slurry layer 1032 at a position aligned with the anode paired recess 1015 after the secondary battery cell 1 is wound and formed; and a fourth insulating adhesive tape T4, stuck on the cathode paired recess 1035.

In the secondary battery cell 1 according to the present invention, the first insulating adhesive tape T1, the second insulating adhesive tape T2, the third insulating adhesive tape T3 and the fourth insulating adhesive tape T4 are single-sided insulating adhesive tape or double-sided insulating adhesive tape. When double-sided insulating adhesive tapes are adopted, the double-sided insulating adhesive tape sticking areas are denser than the sticking areas when single-sided insulating adhesive tapes are used, such that the integrity of the secondary battery cell is enhanced, thus avoiding the area from protruding and becoming the largest deformation area after a reforming process of the secondary battery cell and the secondary battery cell expands due to charging and discharging.

Second, the secondary battery cell winding formation system according to the second aspect of the present invention is elaborated.

With reference to FIG. 1, the secondary battery cell winding formation system according to the present invention comprises a working platform 201, a winding mechanism 202, an anode electrode plate unwinding roller 203, an anode electrode plate cleaning mechanism 204, an anode electrode plate die-cutting mechanism 205, an anode electrode tab supply mechanism 206, an anode electrode tab connection mechanism 207, an anode electrode plate convey mechanism 208, a cathode electrode plate unwinding roller 209, a cathode electrode plate cleaning mechanism 210, a cathode electrode plate die-cutting mechanism 211, a cathode electrode tab supply mechanism 212, a cathode electrode tab connection mechanism 213, a cathode electrode plate convey mechanism 214, a first separator unwinding roller 215A, a second separator unwinding roller 215B, a first separator convey mechanism 216A and a second separator convey mechanism 216B.

The working platform 201 is fixed immovably.

The winding mechanism 202 is disposed on the working platform 201.

The anode electrode plate unwinding roller 203 is disposed on the working platform 201, and is wound with anode electrode plate 101, wherein the anode electrode plate 101 comprises: an anode current collector 1011; and an anode slurry layer 1012 disposed on the surface of the anode current collector 1011.

The anode electrode plate cleaning mechanism 204 is disposed on the working platform 201, is located at the downstream of the anode electrode plate unwinding roller 203, and is used for cleaning out, on the anode electrode plate 101, an anode electrode tab receiving groove 1013 provided with the anode current collector 1011 at the bottom and the anode slurry layer 1012 on the periphery.

The anode electrode plate die-cutting mechanism 205 is disposed on the working platform 201, is located at the downstream of the anode electrode plate cleaning mechanism 204, and is used for, at the side edge of the anode electrode tab receiving groove 1013, die-cutting the anode electrode plate 101 to form an anode electrode plate notch 1014 extending through the anode electrode plate 101.

The anode electrode tab supply mechanism 206 is disposed on the working platform 201, is located at the downstream of the anode electrode plate die-cutting mechanism 205, is wound with an anode electrode tab 102, and is used for supplying the anode electrode tab 102 to the anode electrode tab receiving groove 1013 of the anode electrode plate 101 of the anode electrode plate notch 1014, such that the anode electrode tab 102 is received in the anode electrode tab receiving groove 1013.

The anode electrode tab connection mechanism 207 is disposed on the working platform 201, is located at the downstream of the anode electrode plate die-cutting mechanism 205, and is used for electrically connecting and fixing the anode electrode tab 102 received in the anode electrode tab receiving groove 1013 to the anode current collector 1011 at the anode electrode tab receiving groove 1013.

The anode electrode plate convey mechanism 208 is disposed on the working platform 201, and is used for conveying the anode electrode plate 101 unwound from the anode electrode plate unwinding roller 203 to the winding mechanism 202 sequentially via the anode electrode plate cleaning mechanism 204, the anode electrode plate die-cutting mechanism 205 and the anode electrode tab connection mechanism 207. The cathode electrode plate unwinding roller 209 is disposed on the working platform 201, and is wound with a cathode electrode plate 103, wherein the cathode electrode plate 103 comprises: a cathode current collector 1031; and a cathode slurry layer 1032 disposed on the surface of the cathode current collector 1031.

The cathode electrode plate cleaning mechanism 210 is disposed on the working platform 201, is located at the downstream of the cathode electrode plate unwinding roller 209, and is used for cleaning out, on the cathode electrode plate 103, a cathode electrode tab receiving groove 1033 provided with the cathode current collector 1031 at the bottom and the cathode slurry layer 1032 on the periphery.

The cathode electrode plate die-cutting mechanism 211 is disposed on the working platform 201, is located at the downstream of the cathode electrode plate cleaning mechanism 210, and is used for, on the side edge of the cathode electrode tab receiving groove 1033, die-cutting the cathode electrode plate 103 to form a cathode electrode plate notch 1034 extending through the cathode electrode plate 103.

The cathode electrode tab supply mechanism 212 is disposed on the working platform 201, is located at the downstream of the cathode electrode plate die-cutting mechanism 211, is wound with a cathode electrode tab 104, and is used for supplying the cathode electrode tab 104 to the cathode electrode tab receiving groove 1033 of the cathode electrode plate 103 having die-cut out the cathode electrode plate notch 1034, such that the cathode electrode tab 104 is received in the cathode electrode tab receiving groove 1033.

The cathode electrode tab connection mechanism 213 is disposed on the working platform 201, is located at the downstream of the cathode electrode plate die-cutting mechanism 211, and is used for electrically connecting and fixing the cathode electrode tab 104 received in the cathode electrode tab receiving groove 1033 to the cathode current collector 1031 at the cathode electrode tab receiving groove 1033.

The cathode electrode plate convey mechanism 214 is disposed on the working platform 201, and is used for conveying the cathode electrode plate 103 unwound from the cathode electrode plate unwinding roller 209 to the winding mechanism 202 sequentially via the cathode electrode plate cleaning mechanism 210, the cathode electrode plate die-cutting mechanism 211 and the cathode electrode tab connection mechanism 213.

The first separator unwinding roller 215A is disposed on the working platform 201, and is wound with a separator 105.

The second separator unwinding roller 215B is disposed on the working platform 201, and is wound with another separator 105.

The first separator convey mechanism 216A is disposed on the working platform 201, and is used for conveying the corresponding separator 105 unwound from the first separator unwinding roller 215A to the winding mechanism 202, such that the corresponding separator 105 is configured between the anode electrode plate 101 and the cathode electrode plate 103 after the secondary battery cell is wound and formed.

The second separator convey mechanism 216B is disposed on the working platform 201, and is used for conveying the corresponding separator 105 unwound from the second separator unwinding roller 215B to the winding mechanism 202, such that the corresponding separator 105 is configured between the anode electrode plate 101 and the cathode electrode plate 103 after the secondary battery cell is wound and formed.

In the secondary battery cell winding formation system 2 according to the present invention, the winding mechanism 202, the anode electrode plate unwinding roller 203, the anode electrode plate cleaning mechanism 204, the anode electrode plate die-cutting mechanism 205, the anode electrode tab supply mechanism 206, the anode electrode tab connection mechanism 207, the anode electrode plate convey mechanism 208, the cathode electrode plate unwinding roller 209, the cathode electrode plate cleaning mechanism 210, the cathode electrode plate die-cutting mechanism 211, the cathode electrode tab supply mechanism 212, the cathode electrode tab connection mechanism 213, the cathode electrode plate convey mechanism 214, the first separator unwinding roller 215A, the second separator unwinding roller 215B, the first separator convey mechanism 216A and the second separator convey mechanism 216B are integrated on one working platform 201, thus reducing the volume of the secondary battery cell winding formation system 2, saving the floor area of a factory building, and reducing the manufacturing cost of the secondary battery cell 1; the anode electrode plate die-cutting mechanism 205 can remove burrs cleaned out by the anode electrode plate cleaning mechanism 204 and located on the current collector 1011 on the edge part of the anode electrode tab receiving groove 1013, and the cathode electrode plate die-cutting mechanism 211 can remove burrs cleaned out by the cathode electrode plate cleaning mechanism 210 and located on the current collector 1031 on the edge part of the cathode electrode tab receiving groove 1033, thus effectively preventing the manufactured secondary battery cell 1 from generating internal short circuit, and improving the safety performance of the manufactured secondary battery cell 1.

In one embodiment, the anode electrode tab receiving groove 1013 and the anode paired recess 1015 are respectively cleaned out on the two surfaces of the anode electrode plate 101; and the anode electrode plate convey mechanism 208 can lead and change the convey direction of the anode electrode plate 101, thus realizing a double-side cleaning effect.

In one embodiment, the cathode electrode tab receiving groove 1033 and the cathode paired recess 1035 are respectively cleaned out on the two surfaces of the cathode electrode plate 103; and the cathode electrode plate convey mechanism 214 can lead and change the convey direction of the cathode electrode plate 103, thus realizing a double-side cleaning effect.

In the secondary battery cell winding formation system 2 according to the present invention, with reference to FIG. 1, in one embodiment, the secondary battery cell winding formation system 2 further comprises a central control mechanism 217, in communication connection with and for controlling at least one selected from the anode electrode plate unwinding roller 203, the anode electrode plate cleaning mechanism 204, the anode electrode plate die-cutting mechanism 205, the anode electrode tab supply mechanism 206, the anode electrode tab connection mechanism 207, the cathode electrode plate unwinding roller 209, the cathode electrode plate cleaning mechanism 210, the cathode electrode plate die-cutting mechanism 211, the cathode electrode tab supply mechanism 212, the cathode electrode tab connection mechanism 213 and the winding mechanism 202.

In the secondary battery cell winding formation system 2 according to the present invention, with reference to FIG. 1 and FIG. 3, in one embodiment, the secondary battery cell winding formation system 2 further comprises: a first cathode electrode plate sticking mechanism 218A, disposed on the working platform 201, located at the downstream of the cathode electrode tab connection mechanism 213, and used for sticking a first insulating adhesive tape T1 on the cathode electrode tab receiving groove 1033 having received the cathode electrode tab 104; and a second cathode electrode plate sticking mechanism 218B, disposed on the working platform 201, located between the first cathode electrode plate sticking mechanism 218A and the winding mechanism 202, and used for sticking a second insulating adhesive tape T2 on the cathode slurry layer 1032 at a position aligned with the anode electrode tab receiving groove 1013 after the secondary battery cell 1 is wound and formed.

In the secondary battery cell winding formation system 2 according to the present invention, with reference to FIG. 1, in one embodiment, the anode electrode plate cleaning mechanisms 204 are two, wherein one anode electrode plate cleaning mechanism 204 is used for cleaning out, on the anode electrode plate 101, an anode electrode tab receiving groove 1013 provided with the anode current collector 1011 at the bottom and the anode slurry layer 1012 on the periphery; and the other anode electrode plate cleaning mechanism 204 is used for cleaning out, on the anode electrode plate 101, an anode paired recess 1015 provided with the anode current collector 1011 at the bottom and the anode slurry layer 1012 on the periphery and located exactly on the back side of the anode electrode tab receiving groove 1013; and with reference to FIG. 1 and FIG. 3, in the present embodiment, the second cathode electrode plate sticking mechanism 218B is further used for sticking a third insulating adhesive tape T3 on the cathode slurry layer 1032 at a position aligned with the anode paired recess 1015.

In the secondary battery cell winding formation system 2 according to the present invention, with reference to FIG. 1, in one embodiment, the cathode electrode plate cleaning mechanisms 210 are two, wherein one cathode electrode plate cleaning mechanism 210 is used for cleaning out, on the cathode electrode plate 103, a cathode electrode tab receiving groove 1033 provided with the cathode current collector 1031 at the bottom and the cathode slurry layer 1032 on the periphery: and the other cathode electrode plate cleaning mechanism 210 is used for cleaning out on the cathode electrode plate 103, a cathode paired recess 1035 provided with the cathode current collector 1031 at the bottom and the cathode slurry layer 1032 on the periphery and located exactly on the back side of the cathode electrode tab receiving groove 1033; and with reference to FIG. 1 and FIG. 3, in the present embodiment, the first cathode electrode plate sticking mechanism 218A is further used for sticking a fourth insulating adhesive tape T4 on the cathode paired recess 1035.

In the secondary battery cell winding formation system 2 according to the present invention, with reference to FIG. 1, in one embodiment, the anode electrode plate cleaning mechanisms 204 are two, wherein one anode electrode plate cleaning mechanism 204 is used for cleaning out, on the anode electrode plate 101, an anode electrode tab receiving groove 1013 provided with the anode current collector 1011 at the bottom and the anode slurry layer 1012 on the periphery; and the other anode electrode plate cleaning mechanism 204 is used for cleaning out, on the anode electrode plate 101, an anode paired recess 1015 provided with the anode current collector 1011 at the bottom and the anode slurry layer 1012 on the periphery and located exactly on the back side of the anode electrode tab receiving groove 1013; with reference to FIG. 1, in the present embodiment, the cathode electrode plate cleaning mechanisms 210 are two, wherein one cathode electrode plate cleaning mechanism 210 is used for cleaning out, on the cathode electrode plate 103, a cathode electrode tab receiving groove 1033 provided with the cathode current collector 1031 at the bottom and the cathode slurry layer 1032 on the periphery; and the other cathode electrode plate cleaning mechanism 210 is used for cleaning out, on the cathode electrode plate 103, a cathode paired recess 1035 provided with the cathode current collector 1031 at the bottom and the cathode slurry layer 1032 on the periphery and located exactly on the back side of the cathode electrode tab receiving groove 1033; with reference to FIG. 1 and FIG. 3, in the present embodiment, the first cathode electrode plate sticking mechanism 218A is further used for sticking a fourth insulating adhesive tape T4 on the cathode paired recess 1035; and the second cathode electrode plate sticking mechanism 218B is further used for sticking a third insulating adhesive tape T3 on the cathode slurry layer 1032 at a position aligned with the anode paired recess 1015.

In the secondary battery cell winding formation system 2 according to the present invention, with reference to FIG. 1, in one embodiment, the second battery cell winding formation system 2 further comprises: a plurality of anode electrode plate sensing mechanisms 219, disposed on the working platform 201, in communication connection with the central control mechanism 217, located on a convey path of the anode electrode 101 starting from the anode electrode plate unwinding roller 203 and passing through the anode electrode plate cleaning mechanism 204, the anode electrode plate die-cutting mechanism 205 and the anode electrode tab connection mechanism 207 until the winding mechanism 202, and used for sensing the position of the anode electrode plate 101 on the convey path; and a plurality of anode electrode plate corrective mechanisms 220, disposed on the working platform 201, in communication connection with the central control mechanism 217, located on a convey path of the anode electrode plate 101 starting from the anode electrode plate unwinding roller 203 and passing through the anode electrode plate cleaning mechanism 204, the anode electrode plate die-cutting mechanism 205 and the anode electrode tab connection mechanism 207 until the winding mechanism 202, and used for correcting the anode electrode plate 101.

In the secondary battery cell winding formation system 2 according to the present invention, with reference to FIG. 1, in one embodiment, the second battery cell winding formation system 2 further comprises: a plurality of cathode electrode plate sensing mechanisms 221, disposed on the working platform 201, in communication connection with the central control mechanism 217, located on a convey path of the cathode electrode plate 103 starting from the cathode electrode plate unwinding roller 209 and passing through the cathode electrode plate cleaning mechanism 210, the cathode electrode plate die-cutting mechanism 211 and the cathode electrode tab connection mechanism 213 until the winding mechanism 202, and used for sensing the position of the cathode electrode plate 103 on the convey path; and a plurality of cathode electrode plate corrective mechanisms 222, disposed on the working platform 201, in communication connection with the central control mechanism 217, located on a convey path of the cathode electrode plate 103 starting from the cathode electrode plate unwinding roller 209 and passing through the cathode electrode plate cleaning mechanism 210, the cathode electrode plate die-cutting mechanism 211 and the cathode electrode tab connection mechanism 213 until the winding mechanism 202, and used for correcting the cathode electrode plate 103.

In the secondary battery cell winding formation system 2 according to the present invention, with reference to FIG. 1, in one embodiment, the second battery cell winding formation system 2 further comprises: a plurality of separator sensing mechanisms 223, disposed on the working platform 201, in communication connection with the central control mechanism 217, respectively located on a convey path of the corresponding separator 105 from the first separator unwinding roller 215A to the winding mechanism 202 and another convey path from the second separator unwinding roller 215B to the winding mechanism 202, and used for sensing the position of the corresponding separator 105 on the convey path.

In the secondary battery cell winding formation system 2 according to the present invention, with reference to FIG. 1, in one embodiment, the anode electrode plate unwinding roller 203, the cathode electrode plate unwinding roller 209, the first separator unwinding roller 215A and the second separator unwinding roller 215B can all extend and retract in a direction perpendicular to the working platform 201. The first separator unwinding roller 215A and the second separator unwinding roller 215B extending and retracting in a direction perpendicular to the working platform 201 may cooperate with the separator sensing mechanism 223 to realize deviation correction. Therefore, the feeding of the separator does not add an independent separator corrective mechanism.

In the secondary battery cell winding formation system 2 according to the present invention, with reference to FIG. 1, in one embodiment, the anode electrode plate cleaning mechanism 204 comprises: an anode electrode plate laser cleaning system 2041, for correspondingly cleaning the anode slurry layer 1012 of the passing anode electrode plate 101; an anode electrode plate dust removal mechanism 2042, for removing anode slurry layer 1012 particles generated when the anode electrode plate laser cleaning system 2041 performs cleaning; and an anode electrode plate adsorption and cooling auxiliary platform 2043, for adsorbing, fixing and cooling the anode electrode plate 101 passing through the anode electrode plate laser cleaning system 2041.

In the secondary battery cell winding formation system 2 according to the present invention, with reference to FIG. 1, in one embodiment, the anode electrode plate adsorption and cooling auxiliary platform 2043 can be vacuum pumping adsorption.

In the secondary battery cell winding formation system 2 according to the present invention, with reference to FIG. 1, in one embodiment, the cathode electrode plate cleaning mechanism 210 comprises: a cathode electrode plate laser cleaning system 2101, for correspondingly cleaning the cathode slurry layer 1032 of the passing cathode electrode plate 103; a cathode electrode plate dust removal mechanism 2102, for removing cathode slurry layer 1032 particles generated when the cathode electrode plate laser cleaning system 2101 performs cleaning; and a cathode electrode plate adsorption and cooling auxiliary platform 2103, for adsorbing, fixing and cooling the cathode electrode plate 103 passing through the cathode electrode plate laser cleaning system 2101.

In the secondary battery cell winding formation system 2 according to the present invention, with reference to FIG. 1, in one embodiment, the cathode electrode plate adsorption and cooling auxiliary platform 2103 can be vacuum pumping adsorption.

In the secondary battery cell winding formation system 2 according to the present invention, with reference to FIG. 1, in one embodiment, the anode electrode plate die-cutting mechanism 205 comprises: an anode electrode plate die-cutting male die mechanism 2051; and an anode electrode plate die-cutting female die mechanism 2052, for cooperating with the anode electrode plate die-cutting male die mechanism 2051 to, when the anode electrode plate 101 passes through the anode electrode plate die-cutting mechanism 205, die-cut on the side edge of the anode electrode tab receiving groove 1013, the anode electrode plate 101 to form an anode electrode plate notch 1014 extending through the anode electrode plate 101; and an anode electrode plate waste collection mechanism 2053, for collecting the wastes die-cut off from the anode electrode plate 101.

In the secondary battery cell winding formation system 2 according to the present invention, with reference to FIG. 1, in one embodiment, the cathode electrode plate die-cutting mechanism 211 comprises: a cathode electrode plate die-cutting male die mechanism 2111; and a cathode electrode plate die-cutting female die mechanism 2112, for cooperating with the cathode electrode plate die-cutting male die mechanism 2111 to, when the cathode electrode plate 103 passes through the cathode electrode plate die-cutting mechanism 211, die-cut, on the side edge of the cathode electrode tab receiving groove 1033, the cathode electrode plate 103 to form a cathode electrode plate notch 1034 extending through the cathode electrode plate 103, and a cathode electrode plate die-cut waste collection mechanism 2113, for collecting the wastes die-cut off from the cathode electrode plate 103.

In the secondary battery cell winding formation system 2 according to the present invention, with reference to FIG. 1, in one embodiment, the anode electrode tab connection mechanism 207 comprises: an anode electrode tab welding head mechanism 2071; and an anode electrode tab welding base mechanism 2072, for cooperating with the anode electrode tab welding head mechanism 2071 to weld the anode electrode tab 102 to the anode current collector 1011 at the anode electrode tab receiving groove 1013.

In the secondary battery cell winding formation system 2 according to the present invention, with reference to FIG. 1, in one embodiment, the cathode electrode tab connection mechanism 213 comprises: a cathode electrode tab welding head mechanism 2131; and a cathode electrode tab welding base mechanism 2132, for cooperating with the cathode electrode tab welding head mechanism 2131 to weld the cathode electrode tab 104 to the cathode current collector 1031 at the cathode electrode tab receiving groove 1033.

In the secondary battery cell winding formation system 2 according to the present invention, with reference to FIG. 1, in one embodiment, the winding mechanism 202 comprises: a dust remover 2021, for removing the dust of the anode electrode plate 101, the cathode electrode plate 103 and the two separators 105 conveyed to the winding mechanism 202; and a winding device 2022, for stacking up the anode electrode plate 101, the cathode electrode plate 103 and the two separators 105 conveyed to the winding mechanism 202, and enabling the corresponding separator 105 to be configured between the anode electrode plate 101 and the cathode electrode plate 103 after the secondary battery cell is wound and formed by the winding mechanism 202.

In the secondary battery cell winding formation system 2 according to the present invention, with reference to FIG. 1, in one embodiment, the anode electrode plate convey mechanism 208 comprises: a fixed roller 2081, for passively enabling the anode electrode plate 101 to pass thereon; a main drive mechanism 2082, for actively driving and conveying the anode electrode plate 101; and a main drive corrective mechanism 2083, located at the upstream of the winding mechanism 202 and used for correcting the anode electrode plate 101 having entered the winding mechanism 202.

In the secondary battery cell winding formation system 2 according to the present invention, with reference to FIG. 1, in one embodiment, the cathode electrode plate convey mechanism 214 comprises: a fixed roller 2141, for passively enabling the cathode electrode plate 103 to pass thereon; a main drive mechanism 2142, for actively driving and conveying the cathode electrode plate 103; and a main drive corrective mechanism 2143, located at the upstream of the winding mechanism 202 and used for correcting the cathode electrode plate 103 having entered the winding mechanism 202.

In the secondary battery cell winding formation system 2 according to the present invention, with reference to FIG. 1, in one embodiment, the first separator convey mechanism 216A comprises a fixed roller 216A1 for passively enabling the corresponding separator 105 to pass thereon and conveying to the winding mechanism 202; and the second separator convey mechanism 216B comprises a fixed roller 216B1 for passively enabling the corresponding separator 105 to pass thereon and conveying to the winding mechanism 202.

In the secondary battery cell winding formation system 2 according to the present invention, with reference to FIG. 1, in one embodiment, the secondary battery cell winding formation system 2 further comprises: a plurality of anode electrode plate dust removal portions 224, disposed on the working platform 201, in communication connection with the central control mechanism 217, located on a convey path of the anode electrode plate 101 starting from the anode electrode plate cleaning mechanism 204 and passing through the anode electrode plate die-cutting mechanism 205 and the anode electrode tab connection mechanism 207 until the winding mechanism 202, and used for removing the anode slurry layer 1012 particles generated after the anode electrode plate is cleaned and the electrode tab is welded.

In the secondary battery cell winding formation system 2 according to the present invention, with reference to FIG. 1, in one embodiment, the secondary battery cell winding formation system 2 further comprises: a plurality of cathode electrode plate dust removal portions 225, disposed on the working platform 201, in communication connection with the central control mechanism 217, located on a convey path of the cathode electrode plate 103 starting from the cathode electrode plate cleaning mechanism 210 and passing through the cathode electrode plate die-cutting mechanism 211 and the cathode electrode tab connection mechanism 213 until the winding mechanism 202, and used for removing the cathode slurry layer 1032 particles generated after the cathode electrode plate is cleaned and the electrode tab is welded.

A comparison is performed hereafter between the performance of the secondary battery cell manufactured by the secondary battery cell winding formation system 2 of the present invention and the performance of the secondary battery cell manufactured by the prior art.

Embodiment 1 takes the manufacturing of the 335272 type cell (the finished battery is 3.3 mm thickness, 52 mm width, and 72 mm length) as an example. In the secondary battery cell 1 manufactured by the secondary battery cell winding formation system 2 according to the present invention, with reference to FIG. 2-5, the anode electrode plate cleaning mechanism 204 and the cathode electrode plate cleaning mechanism 210 are used to respectively clean out an anode electrode tab receiving groove 1013 and a cathode electrode tab receiving groove 1033 which are 12 mm length (in the length direction L) and 8 mm width (in the width direction W) at preset positions on the anode electrode plate 101 and the cathode electrode plate 103; the burr areas on the side edges of the anode electrode tab receiving groove 1013 and the cathode electrode tab receiving groove 1033 are die-cut by the anode electrode plate die-cutting mechanism 205 and the cathode electrode plate die-cutting mechanism 211 to form an anode electrode plate notch 1014 and a cathode electrode plate notch 1034 which are 12 mm length and 3 mm width; the long sides of the anode electrode plate notch 1014 and the cathode electrode plate notch are coincident with the corresponding long sides of the anode electrode tab receiving groove 1013 and the cathode electrode tab receiving groove 1033; the anode electrode tab 102 and the cathode electrode tab 104 which are 6 mm width are respectively welded in the anode electrode tab receiving groove 1013 and the cathode electrode tab receiving groove 1033. The first insulating adhesive tape T1 is stuck on the cathode electrode tab receiving groove 1033 having received the cathode electrode tab 104; the second insulating adhesive tape T2 is stuck on the cathode slurry layer 1032 at a position aligned with the anode electrode tab receiving groove 1013 after the secondary battery cell 1 is wound and formed; the third insulating adhesive tape T3 is stuck on the cathode slurry layer 1032 at a position aligned with the anode paired recess 1015 after the secondary battery cell 1 is wound and formed; the fourth insulating adhesive tape T4 is stuck on the cathode paired recess 1035; and the insulating adhesive tapes T1-T4 are 10 μm thickness, 15 mm length and 24 mm width. The insulating adhesive tape is not stuck on the anode electrode plate 101. The secondary battery cell structure according to one embodiment of the present invention is manufactured as above.

Figure 6:
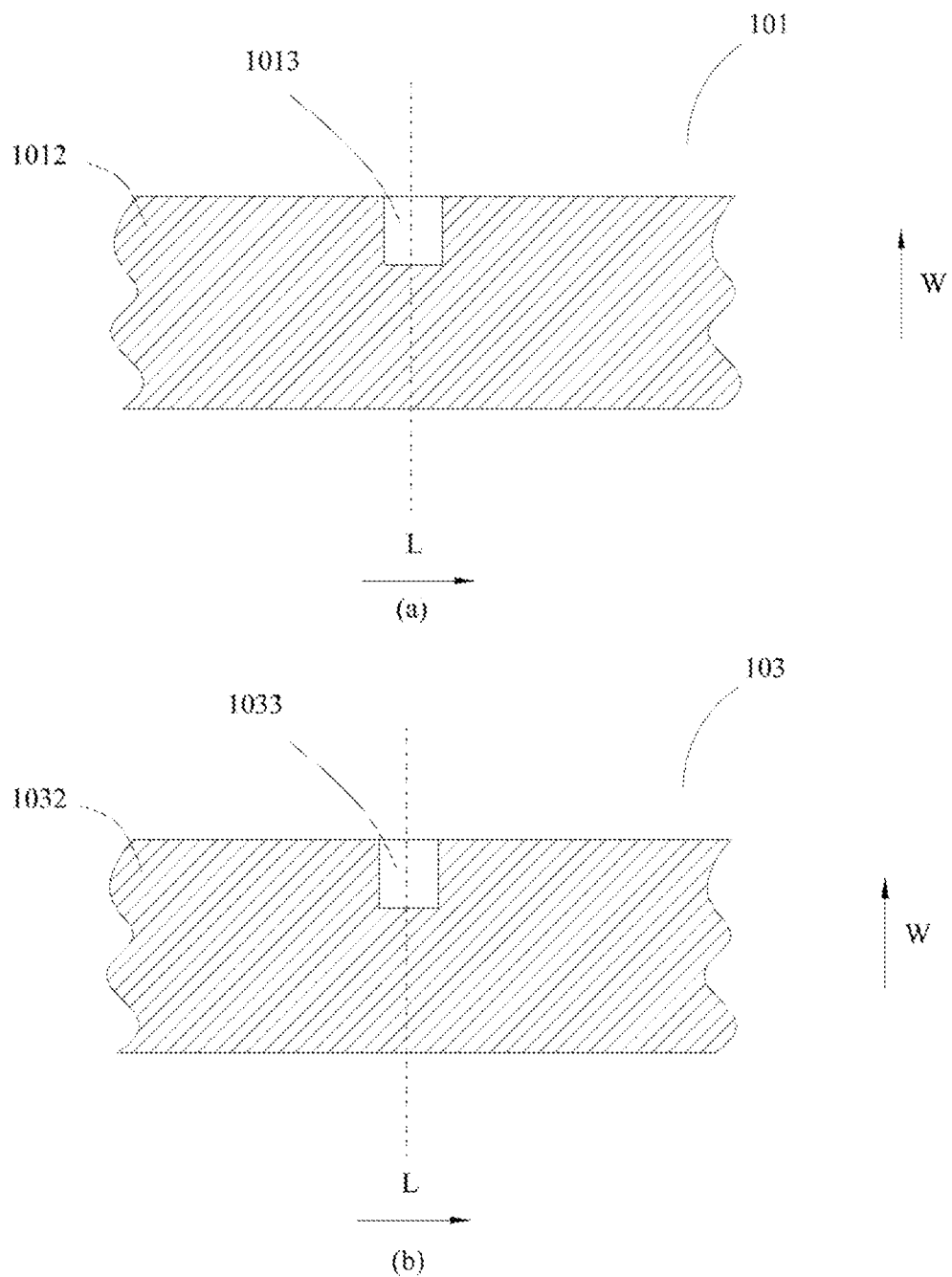

Comparison example 1 also takes the manufacturing of the 335272 type cell (the finished battery is 3.3 mm thickness, 52 mm width, and 72 mm length) as an example, and uses the conventional independent laser cleaning device, welding device and winding device in the prior art to manufacture a secondary battery cell. With reference to FIG. 6, except that the burr areas on the side edges of the anode electrode tab receiving groove 1013 and the cathode electrode tab receiving groove 1033 are not die-cut and removed and that T1-T4 adopt a 35 μm thickness insulating adhesive tape, the others are the same as the embodiment 1.

Comparison example 2 also takes the manufacturing of the 335272 type cell (the finished battery is 3.3 mm thickness, 52 mm width, and 72 mm length) as an example, wherein except that T1-T4 adopt a 10 μm thickness insulating adhesive tape, the others are the same as the comparison example 1.

Twenty pouch cell lithium ion battery samples are respectively selected from the embodiment 1, the comparison example 1 and the comparison example 2 to perform capacity test and thickness measurement; and then the tested pouch cell lithium ion battery samples are dismantled to observe the internal short circuit situation of the cleaning grooves. The results are as shown in table 1.

TABLE 1

| | the test results of the embodiment 1 and the comparison examples 1-2 | | | |
|---|---|---|---|---|
| | Average capacity mAh | Average volume energy density Wh/L | Average thickness mm | The number of samples generating internal short circuit |
| Embodiment 1 | 3027.5 | 937 | 3.28 | 0 |
| Comparison example 1 | 3027.3 | 925 | 3.32 | 0 |
| Comparison example 2 | 3027.4 | 937 | 3.28 | 12 |

It can be seen from the above table 1 that: in the embodiment 1, the secondary battery cells manufactured by the secondary battery cell winding formation system 2 of the present invention ensure a high average volume energy density while none of the cells generates internal short circuit; in the comparison example 1, similarly, none of the cells generates the internal short circuit problem, however the average volume energy density is obviously reduced because a thick insulating adhesive tape is stuck; and in the comparison example 2, a high average volume energy density is ensured, however a high ratio of cells generate internal short circuit.

Therefore, in the embodiment 1, the electrode plate structure using die-cutting off the burr areas on the side edges of the anode electrode tab receiving groove 1013 and the cathode electrode tab receiving groove 1033 can completely solve the internal short circuit problem caused by the burrs, thus improving the safety use performance of the cell; furthermore, the secondary battery cell winding formation system 2 can reduce the comprehensive manufacturing cost of the cell.

What is claimed is:
1. A secondary battery, comprising:
  a first electrode tab;
  a first electrode plate, comprising:
    a first current collector; and
    a first active substance disposed on a first surface of the first current collector and a second surface of the first current collector, wherein the second surface is opposite to the first surface;
  a first electrode tab receiving groove defined by an exposed portion of the first surface of the first current collector and the first active substance on a periphery of the first electrode tab receiving groove, the first electrode tab receiving groove receiving the first electrode tab, wherein the first electrode tab is electrically connected with the first current collector through the first electrode tab receiving groove; and
  a first electrode plate notch disposed on a side edge of the first electrode tab receiving groove and extending through the second surface and the first surface of the first current collector, a first dimension of the first electrode plate notch is greater than a dimension of the first electrode tab, wherein the first dimension of the first electrode plate notch and the dimension of the first electrode tab are defined along a length direction of the first electrode plate.

2. The secondary battery according to claim 1, further comprising:
a first recess disposed opposite to the first electrode tab receiving groove, defined by a corresponding portion of the second surface of the first current collector and the first active substance on a periphery of the first recess.

3. The secondary battery according to claim 1, further comprising:
a second electrode tab;
a second electrode plate, comprising:
a second current collector; and
a second active substance disposed on a surface of the second current
a second electrode tab receiving groove configured to receive the second electrode tab, wherein the second electrode tab is electrically connected with the second current collector through the second electrode tab receiving groove; and
a second electrode plate notch disposed on a side edge of the second electrode tab receiving groove and extending through the surface of the second current collector.

4. The secondary battery according to claim 2, wherein:
the first electrode plate is an anode electrode plate;
the first current collector is an anode current collector;
the first active substance is an anode active substance;
the first electrode tab is an anode electrode tab;
the first electrode tab receiving groove is an anode electrode tab receiving groove;
the first recess is an anode recess; and
the first electrode plate notch is an anode electrode plate notch.

5. The secondary battery according to claim 3, wherein:
the second electrode plate is a cathode electrode plate;
the second current collector is a cathode current collector;
the second active substance is a cathode active substance;
the second electrode tab is a cathode electrode tab;
the second electrode tab receiving groove is a cathode electrode tab receiving groove; and
the second electrode plate notch is a cathode electrode plate notch.

6. The secondary battery according to claim 1, wherein:
the first dimension of the first electrode plate notch is 0.9-1.2 times a length of the first electrode tab receiving groove along the length direction of the first electrode plate; and
a width of the first electrode plate notch is 0.2-0.8 times a width of the first electrode tab receiving groove along a width direction of the first electrode plate.

7. The secondary battery according to claim 3, further comprising:
a first insulating adhesive tape disposed on the second electrode tab receiving groove; and
a second insulating adhesive tape disposed on the second active substance and facing the first electrode tab receiving groove.

8. The secondary battery according to claim 4, further comprising a third insulating adhesive tape disposed on the anode recess.

9. The secondary battery according to claim 5, further comprising:
a fourth insulating adhesive tape;
the cathode electrode plate comprising a cathode recess, wherein the cathode recess and the cathode electrode tab receiving groove are disposed on opposite sides of the cathode current collector; and
the fourth insulating adhesive tape is disposed on the cathode recess.

10. The secondary battery according to claim 7, wherein, each of the first insulating adhesive tape and the second insulating adhesive tape is a single-sided insulating adhesive tape.

11. The secondary battery according to claim 8, wherein, the third insulating adhesive tape is a single-sided insulating adhesive tape.

12. The secondary battery according to claim 9, wherein, the fourth insulating adhesive tape is a single-sided insulating adhesive tape.

13. The secondary battery according to claim 1, wherein:
the first electrode tab receiving groove is defined by the first active substance and extends to the first surface of the first current collector.

14. The secondary battery according to claim 3, wherein, the second electrode tab receiving groove is defined in the second active substance and extends to the surface of the second current collector.

15. The secondary battery according to claim 1, wherein, a whole of the first electrode tab is parallel with the first surface of the first current collector.

16. The secondary battery according to claim 1, wherein a bottom of the first electrode plate notch is located between the first active substance disposed on two opposite sides of the first electrode tab receiving groove in the length direction of the first electrode plate.

17. The secondary battery according to claim 1, wherein a bottom of the first electrode plate notch is located between two opposite side edges of the first electrode plate in a width direction of the first electrode plate.

18. The secondary battery according to claim 1, wherein the secondary battery is a wound-type secondary battery.

* * * * *